(12) United States Patent
Macy et al.

(10) Patent No.: US 7,218,753 B2
(45) Date of Patent: *May 15, 2007

(54) TEMPLATE FOR WATERMARK DECODER SYNCHRONIZATION

(75) Inventors: William W. Macy, Palo Alto, CA (US); Matthew J. Holliman, Libertyville, IL (US)

(73) Assignee: Intel Corporation, Santa Clara, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 10/793,981

(22) Filed: Mar. 5, 2004

(65) Prior Publication Data

US 2004/0170299 A1     Sep. 2, 2004

Related U.S. Application Data

(63) Continuation of application No. 09/540,144, filed on Mar. 31, 2000, now Pat. No. 6,707,926.

(51) Int. Cl.
*G06K 9/00* (2006.01)

(52) U.S. Cl. ................. 382/100; 713/176; 380/219
(58) Field of Classification Search ............. 382/100, 382/232; 713/176; 380/219, 277, 278, 279
See application file for complete search history.

(56) References Cited

U.S. PATENT DOCUMENTS

| | | | |
|---|---|---|---|
| 5,631,978 A | 5/1997 | Galand et al. | 382/240 |
| 5,754,658 A | 5/1998 | Aucsmith | 380/28 |
| 5,905,819 A | 5/1999 | Daly | 382/284 |
| 5,946,414 A * | 8/1999 | Cass et al. | 382/183 |
| 5,949,055 A * | 9/1999 | Fleet et al. | 235/469 |
| 6,141,441 A | 10/2000 | Cass et al. | 382/166 |

(Continued)

OTHER PUBLICATIONS

Caldelli, et al., "Geometric-invariant Robust Watermarking Through Constellation Matching in the Frequency Domain", *Image Processing*, 2000 vol. 2, 65-68.

(Continued)

*Primary Examiner*—Vikkram Bali
*Assistant Examiner*—Anand Bhatnagar
(74) *Attorney, Agent, or Firm*—Schwegman, Lundberg, Woessner & Kluth, P.A.

(57) ABSTRACT

Systems and methods are provided through which a template in the spatial domain is generated and combined with an image. Later, the combined image can be decoded to determine the extent of scaling and or shifting or the combined image. The template comprises at least one vertical or horizontal band. The horizontal band(s) determine the extent of scaling and/or shifting along the vertical axis, and the vertical bands determine the extent of scaling and/or shifting along the horizontal axis of the combined image. Using both horizontal and vertical bands enables decoding of shifting and scaling along both axis, and creates a grid. Each band specifies a predetermined characteristic of modifying the luminance of the corresponding pixels of the image. In one alternative, the modification of the image is performed to the extent that the bands are invisible to the naked eye.

15 Claims, 9 Drawing Sheets

U.S. PATENT DOCUMENTS

| | | | |
|---|---|---|---|
| 6,154,571 A * | 11/2000 | Cox et al. | 382/250 |
| 6,282,300 B1 * | 8/2001 | Bloom et al. | 382/100 |
| 6,400,826 B1 | 6/2002 | Chen et al. | 382/100 |
| 6,408,082 B1 | 6/2002 | Rhoads et al. | 382/100 |
| 6,418,232 B1 | 7/2002 | Nakano et al. | 382/100 |
| 6,512,837 B1 | 1/2003 | Ahmed | 382/100 |
| 6,563,937 B1 | 5/2003 | Wendt | 382/100 |
| 2001/0036292 A1 * | 11/2001 | Levy et al. | 382/100 |
| 2002/0145759 A1 * | 10/2002 | Miller | 358/3.28 |
| 2005/0036657 A1 * | 2/2005 | Rhoads et al. | 382/100 |

OTHER PUBLICATIONS

Lefebvre, et al., "A Print and Scan Optimized Watermarking Scheme", *Multimedia Signal Processing*, 2001 IEEE, 511-516.

Perira, et al., "Robust Template Matching for Affine Resistant Image Watermarks", *Image Processing, IEEE* vol. 9 Issue 6, Jun. 2000.

Ruanaidh, et al., "Template based recovery of Fourier-based Watermarks using log-polar and log—log maps", *Multimedia computing and systems, 1999 IEEE* vol. 1 Jul. 1999, 870-874.

* cited by examiner

TEMPLATE FOR WATERMARK DECODER SYNCHRONIZATION

RELATED APPLICATION

This application is a continuation of U.S. patent application Ser. No. 09/540,144, having the same title as the present application, and filed on Mar. 31, 2000, now issued as U.S. Pat. No. 6,707,926, which is incorporated herein by reference.

FIELD OF THE INVENTION

This invention relates generally to watermarking electronic data, and more particularly to watermarking electronic data with a template in the spatial domain.

BACKGROUND OF THE INVENTION

With the increasing popularity of computers, and with the advent of mass networks such as the Internet, electronic distribution of content, such as documents, images, and sound, has become much more common. However, electronic content distribution has raised concerns for the creators of such content. For example, content creators wish to ensure that copyright and other authorship and ownership and usage information is attached to their electronic content, such that subsequent attempts to determine the author, owner and user of the content are successful. Furthermore, the creators wish to determine that their content has not been altered since first being distributed electronically.

Watermarking is a technology designed to address the concern of digital content owners and providers who wish to distribute their products and material on the Internet or by other means that their content, which includes text images, and video, may be copied, altered and distributed without permission. Digital watermarking inserts information in digital content that can be recovered even if the watermarked content is altered with significant degradation or alteration.

Watermarking allows questions of ownership and use of a given piece of content—which may be widely distributed by virtue of the Internet, for example—to be resolved, by attempting to decode an embedded secret from the content. That is, by watermarking content data, the data owner can determine whether a suspect piece of content is his or hers by determining whether the watermark is present in the suspect data. Watermarking is a technique used to label digital content by hiding copyright or other information into the underlying data. Unlike encryption used to restrict access to data, watermarking can be employed to provide solid evidence of authorship and usage. Like data hiding generally, the watermark remains with the media through typical content-preserving manipulations, e.g. cropping, compression, and so forth. However, unlike data hiding generally, with watermarking an unauthorized user cannot access the embedded information (e.g. the watermark). In addition, the power of an effective watermarking system lies in its degree of robustness. Robustness ensures that the embedded watermark can not be removed or tampered without destroying or at least degrading the quality of the information.

Generally the information embedded in the watermark is a pattern whose location is known by the watermark detector. Robust watermarks can be detected following operations that do not change the position of the watermark such as the addition of noise and blurring. However, detectors that must know the position of the watermark cannot detect it following operations that change its position. Common operations that change the position of a watermark are shifts and scaling. Images can be scaled and shifted following printing and scanning and videos can be scaled and shifted following analog to digital conversion.

A template is a secondary watermark that can be used to synchronize the detector with the primary watermark. Templates like other watermarks can be embedded in the spatial domain or the frequency domain. A template that is embedded in the frequency domain using the Fourier transform increases the magnitude of Fourier coefficients as disclosed by Shelby Pereira, Joseph J. K. O' Ruanaidh and Thierry Pun, "Secure robust digital watermarking using the lapped orthogonal transform, Society of Photo-optical Instrumentation Engineers, Vol. 3657, January 1999, pp. 21–30, which is incorporated herein. Templates produced by this method tend to become visible for images and video the size used by MPEG1 or smaller. Visibility is a problem for a template because a visible template is more easily detected, and then thwarted. Templates implemented in the frequency domain are difficult to the control artifacts, and are easy to distort through common image processing operations such as blurring and low-bit rate compression.

For the reasons stated above, and for other reasons stated below which will become apparent to those skilled in the art upon reading and understanding the present specification, there is a need in the art for an invisible watermark that in the spatial domain that can decoded even after scaling and shifting of the image.

DETAILED DESCRIPTION OF THE INVENTION

The above-mentioned shortcomings, disadvantages and problems are addressed by the present invention, which will be understood by reading and studying the following specification.

The present invention describes systems, clients, servers, methods, and computer-readable media of varying scope. In addition to the aspects and advantages of the present invention described in the overview, further aspects and advantages of the invention will become apparent by reference to the drawings and by reading the detailed description that follows.

In the following detailed description of some embodiments of the invention, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims. In the following detailed description of some embodiments of the invention, reference is made to the accompanying drawings which form a part hereof, and in which is shown by way of illustration of specific embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

The detailed description is divided into five sections. In the first section, the hardware and the operating environment in conjunction with which some embodiments of the invention may be practiced are described. In the second section, a system level overview of the invention is presented. In the third section, methods for an embodiment of the invention are provided. In the fourth section, a particular object-oriented Internet-based implementation of the invention is described. Finally, in the fifth section, a conclusion of the detailed description is provided.

Hardware and Operating Environment

Figure 1:
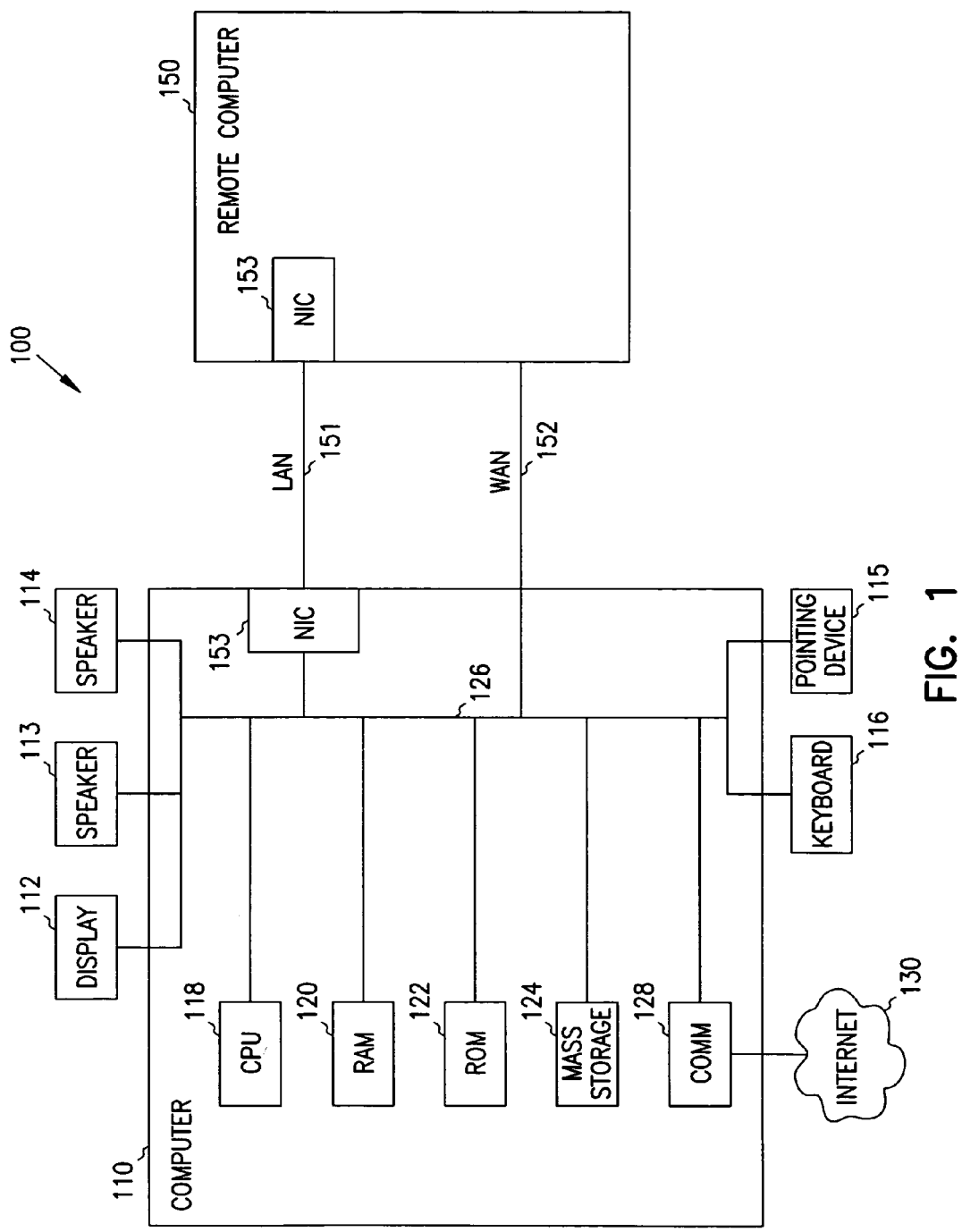
FIG. 1 is a block diagram of the hardware and operating environment in which different embodiments of the invention can be practiced.

FIG. 1 is a block diagram of the hardware and operating environment 100 in which different embodiments of the invention can be practiced. The description of FIG. 1 provides an overview of a computer hardware and a suitable computing environment in conjunction with which some embodiments of the present invention can be implemented. Some embodiments of the present invention are described in terms of a computer executing computer-executable instructions. However, some embodiments of the present invention can be implemented entirely in computer hardware in which the computer-executable instructions are implemented in read-only memory. One embodiment of the invention can also be implemented in client/server computing environments where remote devices that are linked through a communications network perform tasks. Program modules can be located in both local and remote memory storage devices in a distributed computing environment.

Computer 110 is operatively coupled to display device 112, pointing device 115, and keyboard 116. Computer 110 includes a processor 118, commercially available from Intel, random-access memory 120 (RAM), read-only memory 122 (ROM), and one or more mass storage devices 124, and a system bus 126, that operatively couples various system components including the system memory to the processing unit 118. Mass storage devices 124 are more specifically types of nonvolatile storage media and can include a hard disk drive, a floppy disk drive, an optical disk drive, and a tape cartridge drive. The memory 120, 122, and mass storage devices, 124, are types of computer-readable media. A user enters commands and information into the computer 110 through input devices such as a pointing device 115 and a keyboard 116. Other input devices (not shown) can include a microphone, joystick, game pad, satellite dish, scanner, or the like. The processor 118 executes computer programs stored on the computer-readable media. Embodiments of the present invention are not limited to any type of computer 110. In varying embodiments, computer 110 comprises a PC-compatible computer, a MacOS-compatible computer or a UNIX-compatible computer. The construction and operation of such computers are well known within the art.

Furthermore, computer 110 can be communicatively connected to the Internet 130 via a communication device 128. Internet 130 connectivity is well known within the art. In one embodiment, a communication device 128 is a modem that responds to communication drivers to connect to the Internet via what is known in the art as a "dial-up connection." In another embodiment, a communication device 128 is an Ethernet or similar hardware (network) card connected to a local-area network (LAN) that itself is connected to the Internet via what is known in the art as a "direct connection" (e.g., T1 line, etc.).

Computer 110 can be operated using at least one operating environment to provide a graphical user interface including a user-controllable pointer. Such operating environments include operating systems such as versions of the Microsoft Windows and Apple MacOS operating systems well-known in the art. Embodiments of the present invention are not limited to any particular operating environment, however, and the construction and use of such operating environments are well known within the art. Computer 110 can have at least one web browser application program executing within at least one operating environment, to permit users of computer 110 to access intranet or Internet world-wide-web pages as addressed by Universal Resource Locator (URL) addresses. Such browser application programs include Netscape Navigator and Microsoft Internet Explorer.

Display device 112 permits the display of information, including computer, video and other information, for viewing by a user of the computer. Embodiments of the present invention are not limited to any particular display device 112. Such display devices include cathode ray tube (CRT) displays (monitors), as well as flat panel displays such as liquid crystal displays (LCD's). Display device 112 is connected to the system bus 126. In addition to a monitor, computers typically include other peripheral input/output devices such as printers (not shown), speakers, pointing devices and a keyboard. Speakers 113 and 114 enable the audio output of signals. Speakers 113 and 114 are also connected to the system bus 126. Pointing device 115 permits the control of the screen pointer provided by the graphical user interface (GUI) of operating systems such as versions of Microsoft Windows. Embodiments of the present invention are not limited to any particular pointing device 115. Such pointing devices include mouses, touch pads, trackballs, remote controls and point sticks. Finally, keyboard 116 permits entry of textual information into computer 110, as known within the art, and embodiments of the present invention are not limited to any particular type of keyboard.

The computer 110 can operate in a networked environment using logical connections to one or more remote computers, such as remote computer 150. These logical connections are achieved by a communication device coupled to, or a part of, the computer 110; embodiments of the present invention are not limited to a particular type of communications device. The remote computer 150 can be another computer, a server, a router, a network PC, a client, a peer device or other common network node. The logical connections depicted in FIG. 1 include a local-area network (LAN) 151 and a wide-area network (WAN) 152. Such networking environments are commonplace in offices, enterprise-wide computer networks, intranets and the Internet.

When used in a LAN-networking environment, the computer 110 and remote computer 150 are connected to the local network 151 through a network interface or adapter 153, which is one type of communications device. When used in a conventional WAN-networking environment, the computer 110 and remote computer 150 communicate with a WAN 152 through modems (not shown). The modem, which can be internal or external, is connected to the system bus 126. In a networked environment, program modules depicted relative to the computer 110, or portions thereof, can be stored in the remote memory storage device.

System Level Overview

Figure 2:
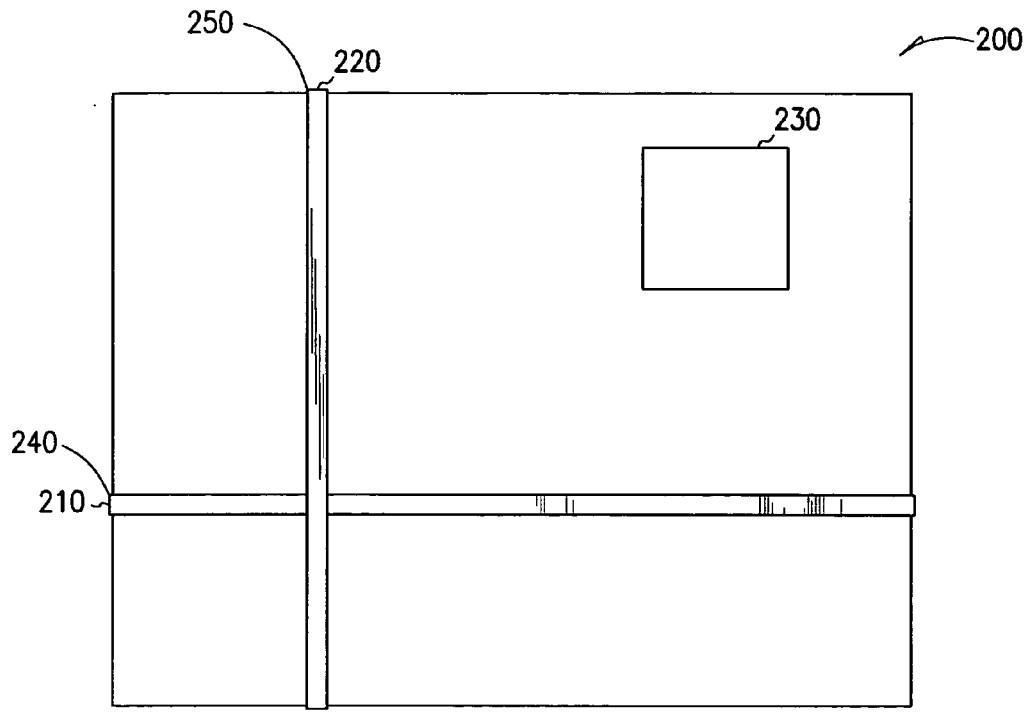
FIG. 2 is a diagram illustrating a system-level overview of an embodiment of the invention.

FIG. 2 is a block diagram that provides a system level overview of the operation of some embodiments of the present invention. Embodiments of the invention are described as operating in a multi-processing, multi-threaded operating environment on a computer, such as computer 110 in FIG. 1.

System 200 includes an image 200 that includes one or more spatial watermark bands. The watermark bands are used to determine the extent of scaling and/or shifting of the image. Any number of horizontal bands 210 can be implemented, and any number of vertical band(s) 220 can be implemented. The horizontal band(s) 210 determine the extent of scaling and/or shifting along the vertical axis, and the vertical band(s) 220 determine the extent of scaling and/or shifting along the horizontal axis of the image. Using both horizontal and vertical bands enables decoding of shifting and scaling along both axis, and creates a grid. The grid is a template, because in image processing, a template is pattern that is used to identify or match an image. In one embodiment, order to increase the stealth of the bands and reduce visual confusion with the image, the bands are invisible, in which the bands modify the luminance of the image in a visually imperceptible degree or extent.

In one embodiment, the image 200 includes another watermark 230 that is used for any of the common watermarking purposes, such as to identify a source of the image 200.

The horizontal band(s) 210 have a starting position 240 within the image 200, and the vertical band(s) 220 have a starting position 250 within the image 200.

Where a dimension, such as the horizontal dimension, has a plurality of bands (not shown), each of the bands has a distance separating each band from the adjacent bands in the same dimension. In one embodiment, the distance is offset in accordance with a randomly generated value from a predetermined seed or key.

Each band has a shape. A shape is a modification of the corresponding pixels in the image. Furthermore, in one embodiment, all of the bands in an image have a common shape. In another embodiment, all of the bands in a first dimension, such as the horizontal dimension, have a common shape, while all of the bands in second dimension have a common shape that is different than the shape of the bands in the first dimension. In yet another embodiment, the bands have varying and predetermined shapes. In still yet another embodiment, the bands have a shape that is determined by characteristics of the corresponding pixels in the image.

Lastly, the invention is used in an embodiment where each image is a frame in a video stream, in which bands are used to determine shifting and/or scaling throughout the entire video stream.

The system level overview of the operation of an embodiment of the invention has been described in this section of the detailed description. A spatial template is used to identify shifting an scaling in an image. While the invention is not limited to any particular band, type of image, type of watermark, or type of video stream, for sake of clarity a simplified image has been described.

Methods of an Embodiment of the Invention

In the previous section, a system level overview of the operation of an embodiment of the invention was described. In this section, the particular methods performed by the server and the clients of such an embodiment are described by reference to a series of flowcharts. Describing the methods by reference to a flowchart enables one skilled in the art to develop such programs, firmware, or hardware, including such instructions to carry out the methods on suitable computerized clients (the processor of the clients executing the instructions from computer-readable media). Similarly, the methods performed by the server computer programs, firmware, or hardware are also composed of computer-executable instructions. Describing the methods by reference to flowcharts enables one skilled in the art to develop programs, firmware, or hardware, including instructions to carry out the methods on a suitable computerized server (the processor of the clients executing the instructions from computer-readable media). Methods 300–800 are performed by a client program executing on, or performed by firmware or hardware that is a part of, a computer, such as computer 110 in FIG. 1.

Figure 3:
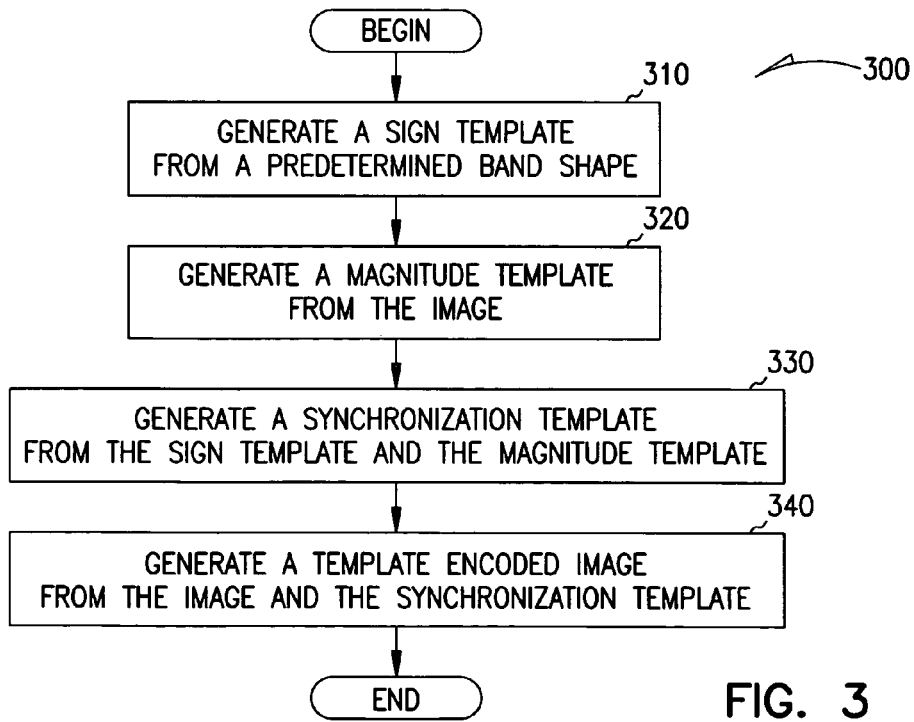
FIG. 3 is a flowchart of a method of encoding a template in the spatial domain performed by a computer according to an embodiment of the invention.

FIG. 3 is a flowchart of a method 300 of encoding a template in the spatial domain performed by a computer according to an embodiment of the invention is shown. Method 300 is a flowchart of a method of producing a watermarked image.

An image is encoded by embedding one or more bands into the image. In varying embodiments, the method 300 will encode the image with row (horizontal) bands, column (vertical) bands, or with both row and column bands. In the embodiment where the image is encoded with at least one row band and at least one column band, the bands are a grid.

In another embodiment, the image is a frame in a video stream, in which a number of frames are processed by the method 300.

Method 300 includes receiving a predetermined band shape and generating a sign template from a predetermined band shape 310. In one embodiment, is a data structure values represented by the notation in Table 1:

TABLE 1

$S_j = \{-1, -1, 1, 1, -1, -1\}$

A template band with the shape defined in Table 1 subtracts the template from the first two rows or columns, adds the template to the next two rows or columns, and subtracts the template from the fifth and sixth rows or columns. At the intersection of row and column bands the sign of $S_j$ is used if $S_j$ has the same sign for both bands. Otherwise, the pixel value is not changed if $S_j$ is different for the row and column bands. The sign template is a data structure. The signs at all positions of the sign template, indicated by notation $S_k$, can be computed during initialization because they are independent of image or frame magnitudes.

In one embodiment, generating a sign template includes receiving a predetermined starting position that specifies a starting position of the where the template is to be encoded in the image, and a plurality of predetermined separation distances specifying distances that encoded templates will be from each other in the encoded image.

In another embodiment, generating a sign template includes generating a plurality of sign band templates in accordance with or from information that includes the predetermined starting position and the plurality of predetermined separation distances. In yet another embodiment, the sign template has the same dimensions as the image. In one embodiment, the positions of bands are determined in which the first band position is set at an offset, and subsequent band positions are determined by the position of the previous band plus a fixed band spacing plus or minus an offset. In one embodiment, the offsets are generated by a random number generator from a seed or key. In another embodiment, the offsets are predetermined and received.

Furthermore, if the position determined is not beyond the end of the row or column then action 2 is repeated to compute the next band position. Otherwise, calculation of band positions stops. The sign of the template at positions p+j is given by $S_j$, except at intersections of row and column bands, where p indicates the position of the band. For example, in the case of column bands using the band shape template of Table 1, columns p, p+1, p+4, and p+5 are subtracted and columns p+2 and p+3 are added.

The method also includes receiving an image and generating a magnitude template from the image 320. In one embodiment, a magnitude template is a data structure that indicates the maximum magnitude that each pixel in the final product of the method, a template encoded image, is such that the encoded template is invisible. Each representation of a magnitude in the magnitude template corresponds to a pixel in the image.

In one embodiment, generating a magnitude template 320 includes, generating a plurality of pixel magnitudes from the luminosity of the corresponding pixel in the image, a filter and a predetermined coefficient, and in which the magnitude template has the same dimensions as the image.

The template magnitude is shown in Equation 1 as follows:

$$M_k = \Sigma_i |L_{k+o} C \, F_i|$$ Equation 1

Where $M_k$ is the magnitude at image or frame at position k. Furthermore, L is the image luminosity at position k plus an offset, o, that is dependent on filter position of F (o is zero where $F_i=8$ for example) and therefore the filter index I. C is a coefficient that is predetermined so that the template is not visible. Lastly, $F_i$ is the filter value at I. The filter determines the magnitude of the template.

In one embodiment, the filter mask is shown below in Table 2:

TABLE 2

$$F = \begin{matrix} -1 & -1 & -1 \\ -1 & 8 & -1 \\ -1 & -1 & -1 \end{matrix}$$

Magnitudes are dependant on the frame luminosity and must be computed for each frame.

In other embodiments of the invention, the magnitude is determined from models of the human visual system.

Actions 310 and 320 be performed in any order relative to each other, and simultaneously.

Thereafter, the method includes generating a synchronization template 330 from the sign template that was generated in action 310 and from the magnitude template that was generated in action 320. In one embodiment, generating the synchronization template, represented by notation $T_k$, includes generating the product of the sign template, represented by notation $S_k$, and the magnitude template, represented by notation $M_k$, is shown by Equation 2 below:

$$T_k = M_k S_k$$ Equation 2

Where the synchronization template is represented by notation $T_k$, the sign template is represented by notation $S_k$, and the magnitude template is represented by notation $M_k$. The synchronization template has the same dimensions as the image.

Action 330 produces an invisible spatial domain template for synchronizing a watermark decoder with a watermark. This template has advantages that it is operates in the spatial domain so that artifacts which reduce quality can be controlled. This template is designed to be used in conjunction with a watermark to synchronize the decoder following shifting and scaling. These operations often occur as a consequence of analog to digital conversion. It is simpler to use this spatial domain template with the spatial domain watermark than a frequency domain template. Also, this template stands up well to image processing operations like blurring, addition of noise, and low bit-rate compression.

Subsequently, the method optionally includes generating a template encoded image from the image and the synchronization template 340. In one embodiment, generating a template encoded image includes generating the mathematical sum of the image and the synchronization template, in which the template encoded image has the same dimensions as the image. In one embodiment, the synchronization template is added to the image.

Figure 4:
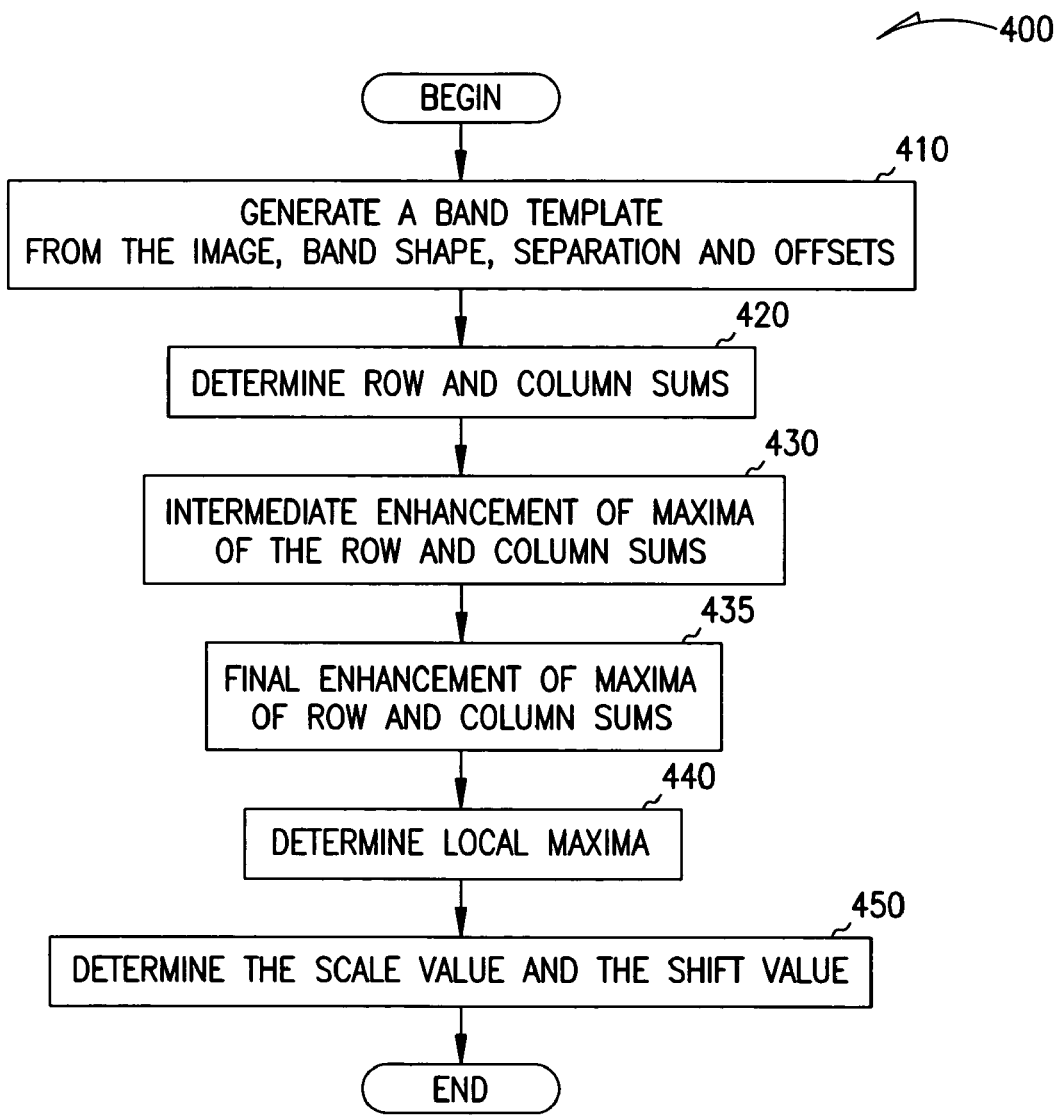
FIG. 4 is a flowchart of a method of a computerized method for decoding a spatial template that is encoded in an image.

FIG. 4 is a flowchart of a method 400 of a computerized method for decoding a spatial template that is encoded in an image. The method synchronizes band(s) with the image to determine a shift value and a scaling value of the image.

Method 400 includes receiving an image encoded with a spatial template, the band shape of the spatial template, band separation of the template, and separation offsets. Thereafter, method 400 generates a band template from the image by determining the positions of bands in the grid 410 from the received image, band shape, band separation and separation offsets, yielding a band template. In one embodiment, generating the band template 410 includes determining positions of band further which further includes generating a plurality of sign bands in accordance with, or from, information comprising a predetermined starting position and a plurality of predetermined separation distances, and in which the band template has the same dimensions as the image.

In another embodiment, generating the band template further includes offsetting the predetermined separation distances. In one embodiment, the separation distances are determined or generated by a random number generator from the key or seed that was used in the random generation of the band offsets in action 310 of method 300. In another embodiment, the offsets are predetermined and received.

Thereafter, the method includes determining or generating row and column sums 420 from the image. The action of computing the row and columns sums 420 does not involve any use of the knowledge of bands or band positions. All of the values of each column and row in each image are summed. At the end of the action, the number of row sums equals the number of rows and the number of column sums equals the number of columns.

In the embodiment where the image is a frame in a video stream, the summing of the each row and each column continues to the corresponding rows and columns in the other frames in the video stream.

In another embodiment, the template sums are represented by a data structure, such as an array, in which each cell in the array corresponds to a unique column and row in the image.

More specifically, the actions included in summing 420 for a video stream include initialize row and column sums to zero, sum all pixel luminance values of each row and column, then add the luminance values of each row and column in current frame to sums accumulated in previous frames repeatedly for each frame.

Subsequently, method 400 includes an intermediate enhancement of the local maxima of the row and column sums 430. This action is described in detail in conjunction with FIG. 5.

Thereafter, the method includes a final enhancement of the local maxima of the row and column sums 435. This action is described in detail in conjunction with FIG. 5A.

Thereafter, method 400 includes determining a local maxima template 440 from the row and column sums. This action is described in detail in conjunction with FIG. 6.

Lastly, method 400 includes determining the scale value and the shift value 450 from the local maxima template and the band template.

Figure 5:
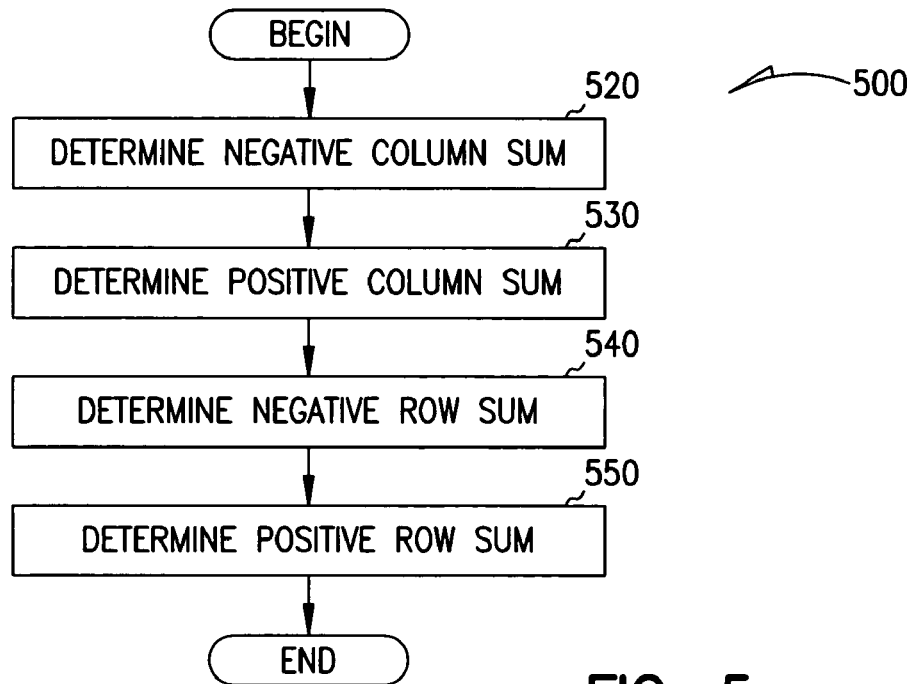
FIG. 5 is a flowchart of a method of a computerized method for an intermediate enhancement of the local maxima of the row and column sums.

FIG. 5 is a flowchart of a method 500 of a computerized method for intermediate enhancement of the local maxima of the row and column sums, as in action 430 in FIG. 4.

The method 500 includes computing or determining the intermediate enhanced column sum, $X_k$, at column position k. The intermediate enhanced column sum, $X_k$, is composed of the sum of negative columns, $X_k^{neg}$, and the sum of positive columns, $X_k^{pos}$.

The equation for determining the intermediate enhanced sum of negative columns 520, $X_k^{neg}$, is described below in Equation 3:

$$X_k^{neg} = (\Sigma_i^{nneg} L_{k+I} S_i^{neg})/nneg \qquad \text{Equation 3}$$

Where S is the template band shape, and $S_i^{neg}$ represents the negative values of S, and where L is a column sum. For example, for the band shape defined in Table 1, $S_i^{neg}$ is 1 for I=0, 1, 4, 5 and it is zero for I=2 and 3. nneg represents the number of negative values in the column, which is 4 where for I=0, 1, 4, 5.

The equation for determining the intermediate enhanced column sum of positive columns 530, $X_k^{pos}$, is described below in Equation 4:

$$X_k^{pos} = (\Sigma_i^{npos} L_{k+I} S_i^{pos})/npos \qquad \text{Equation 4}$$

Where S is the template band shape, and $S_i^{pos}$ represents the positive values of S, and where L is a column sum. For example, for the shape defined in Table 1, $S_i^{pos}$ is 1 for I=2 and 3, and npos represents the number of positive values in the column, which is 2 where I=2 and 3.

In one embodiment, the method determines the intermediate enhanced average column sum of negative columns as in Equation 3 and action 520, and the positive column sum as in Equation 4 and action 530, for each specific band position. The summing described in Equations 3 and 4, and action 520 and 530, respectively, are reiterated until all possible band positions in the image are exhausted.

The equation for determining the average sum of all columns, $X_k$ is described below in Equation 5:

$$X_k = X_k^{pos} + X_k^{neg} \qquad \text{Equation 5}$$

Where $X_k^{pos}$ is a positive value and $X_k^{neg}$ is a negative value. The value of k varies during the template search.

Where k is a band position, the shape array S will match its position during the embedding method 300. In this case $S_i^{pos}$ will be in positions where template values were added and $S_i^{neg}$ will be where they were subtracted. Therefore, $X_k^{pos}$ will generally be greater than the absolute value of $X_k^{neg}$ so $X_k$ will tend be positive. On the other hand if k is two pixels to the right or left of a band position $S_i^{pos}$ will be in positions where values were subtracted during embedding, method 300, the $S_i^{neg}$ will be in a positions where they were added. Therefore, $X_k^{pos}$ will generally be less than the absolute value of $X_k^{neg}$ so $X_k$ will tend to be negative.

Thereafter, the method includes computing or determining the row sum, $Y_k$, at column or row position k, similar to the computation of column sums, 520 and 530. The equation for determining the average sum of negative rows 540, $Y_k^{neg}$, is described below in Equation 6:

$$Y_k^{neg} = (\Sigma_i^{nneg} L_{k+I} S_i^{neg})/nneg \qquad \text{Equation 6}$$

Where S is the template band shape, and $S_i^{neg}$ represents the negative values of S, and where L is a row sum. For example, for the band shape defined in Table 1, $S_i^{neg}$ is −1 for I=0, 1, 4, 5 and it is zero for I=2 and 3. nneg represents the number of negative values in the row, which is 4 where for I=0, 1, 4, 5.

The equation for determining the average sum of positive rows 550, $Y_k^{pos}$, is described below in Equation 7:

$$Y_k^{pos} = (\Sigma_i^{npos} L_{k+I} S_i^{pos})/npos \qquad \text{Equation 7}$$

Where S is the template band shape, and $S_i^{pos}$ represents the positive values of S, and where L is a row sum. For example, for the shape defined in Table 1, $S_i^{pos}$ is 1 for I=2 and 3, and npos represents the number of positive values in the row, which is 2 where I=2 and 3.

In one embodiment, the method determines the intermediate enhanced average row sum of negative rows as described in Equation 6 and action 540, and the positive row sum as in Equation 7 and action 550, for each specific band position. The summing described in Equations 6 and 7, and action 540 and 550, respectively, are reiterated until all possible band positions in the image are exhausted.

The equation for determining the average sum of all rows, $Y_k$ is described below in Equation 8:

$$Y_k = Y_k^{pos} + Y_k^{neg} \qquad \text{Equation 8}$$

Where that $Y_k^{pos}$ is a positive value and $Y_k^{neg}$ is a negative value. The value of k varies during the template search.

Where k is a band position, the shape array S will match its position during the embedding method 300. In this case $S_i^{pos}$ will be in positions where template values were added and $S_i^{neg}$ will be where they were subtracted. Therefore, $Y^{ipos}$ will generally be greater than the absolute value of $Y^{ineg}$ so $Y_k$ will tend be positive. On the other hand if k is two pixels to the right or left of a band position $S_i^{pos}$ will be in positions where values were subtracted during embedding, method 300, the $S_i^{neg}$ will be in a positions where they were added. Therefore, $Y_k^{pos}$ will generally be less than the absolute value of $Y_k^{neg}$ so $Y_k$ will tend to be negative.

In one embodiment where each image is a frame in a video steam, actions 520–550 are performed for each frame, in which the initial values of $X_k$ and $Y_k$ for each frame are their final values of the previous frame, so values of $X_k$ and $Y_k$ are summed from frame to frame, for all frames in the video stream.

Figure 5A:
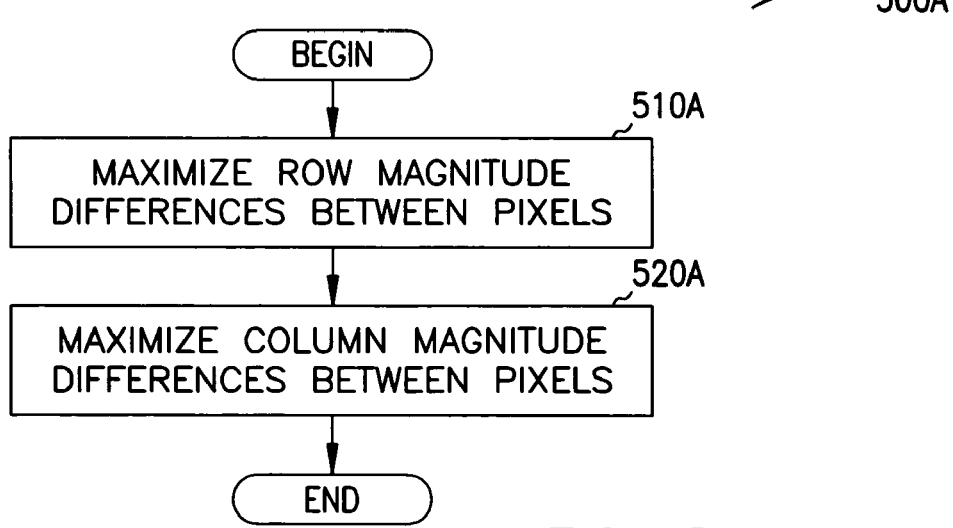
FIG. 5A is a flowchart of a method of a computerized method for a final enhancement of the local maxima of the row and column sums.

FIG. 5A is a flowchart of a method 500A of a computerized method for final enhancement of the local maxima of the column and column sums, as in action 435 in FIG. 4.

The method includes maximizing the differences in column magnitude between pixels 510A, as shown in Equation 9 below:

$$X_k' = X_k - (X_{k+2} + X_{k-2})/2 \qquad \text{Equation 9}$$

Where $X_k'$ is a final enhanced column sum for an intermediate enhanced column sum, $X_k$, that is the product of Equation 5. K is iterated for all intermediate enhanced column sums. More specifically, each final enhanced column sum, $X_k'$, is the intermediate enhanced column sum, $X_k$, subtracted with the average of the two intermediate enhanced column sums in the neighborhood. For example, Equation 9 averages the intermediate enhanced column sums two positions in distance from the computed final enhanced column sum.

The method includes maximizing the differences in row magnitude between pixels, 520A, as shown in Equation 10 below:

$$Y_k' = Y_k - (Y_{k+2} + Y_{k-2})/2 \qquad \text{Equation 10}$$

Where $Y_k'$ is an final enhanced row sum for an intermediate enhanced row sum, $Y_k$, that is the product of Equation 5. K is iterated for all intermediate enhanced row sums. Peaks will tend to occur where k is a band position. More specifically, each final enhanced row sum, $Y_k'$, is the intermediate enhanced row sum, $Y_k$, subtracted with the average of the two intermediate enhanced row sums in the neighborhood. For example, Equation 10 averages the intermediate enhanced row sums two positions in distance from the computed final enhanced row sum.

Figure 6:
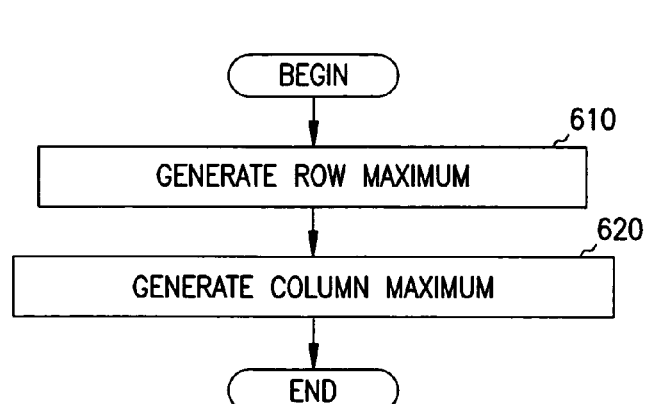
FIG. 6 is a flowchart of a computerized method for determining a local maxima template from row and column sums, as in action 440 in FIG. 4.

FIG. 6 is a flowchart of a computerized method 600 for locating, identifying, selecting, providing or determining a local maxima template from final enhanced maxima, as in action 440 in FIG. 4.

More specifically, a local maxima template is determined from final enhanced maxima of $X_k'$ and $Y_k'$ as produced in FIG. 5A and in action 435 in FIG. 4. The method includes determining, generating or computing a first local row maximum 610. A variable J is set equal to zero and a determination is made as to whether $X_k'$ is greater than all other values of $X_{k+j}'$ within the local maximum range, R, from k−R to k+R (k−R>=0 and k+R<row or column length; and where J varies from −R to +R. If the result is a maximum in this range then it is added to the list of local maximums.

The method also includes determining, generating or computing a first local column maximum 620. A variable J is set equal to zero and a determination is made as to whether $Y_k'$ is greater than all other values of $Y_{k+j}'$ within the local maximum range, R, from k−R to k+R (k−R>=0 and k+R<row or column length; and where J varies from −R to +R. If the result is a maximum in this range then it is added to the list of local maximums.

$X_k$ and $Y_k$ will generally be positive and $X_{k+2}$, $X_{k-2}$, $Y_{k+2}$ and $Y_{k-2}$ will tend to be negative. Actions 610 and 620 are performed in varying embodiments, in any order relative to each other, or in parallel.

Actions 610 and 620 are repeated to the end of each row or column, respectively. The local maximum positions will be in a sorted order from lowest to highest in the local maxima template. Band template positions will also be sorted from lowest to highest.

In an example of locating maxima method 600, a neighborhood is defined as 2N+1 pixels wide. A neighborhood is a view into a block of pixels. Where N is 4, then the neighborhood is 9 pixels wide. Moreover, where the region ranges from 0 to 2N, or in this case, 0 to 8, the center is at pixel 4. If the value at pixel 4 is greater than any of the other values then pixel 4 is a local maximum. Later, the neighborhood is moved so that the center of the neighborhood is at pixel 5. Where the value at pixel 5 greater than all other values between pixel 1 and pixel 9, then the value at pixel 6 is greater than all pixel values between pixel 2 and pixel 10, etc. The values that are used to determine these local maxima are $X_k'$ as defined in Equation 9, and $Y_k'$ as defined in Equation 10, which are produced by the enhancement procedure 600. The subscript k is incremented which refers to the row or column and the pixel value at the position indicated by the subscript k is compared to determine if that value is a maximum or minimum.

Figure 7:
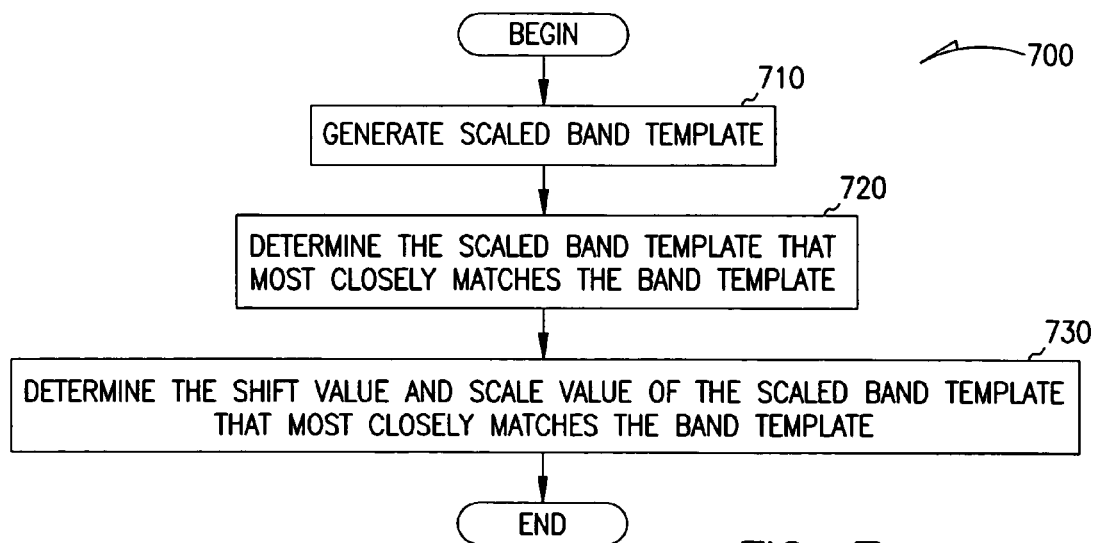
FIG. 7 is a flowchart of a computerized method for determining the scale value and the shift value from the local maxima template and the band template, as in action 450 in FIG. 4.

FIG. 7 is a flowchart of a computerized method 700 for determining the scale value and the shift value from the local maxima template and the band template, as in action 450 in FIG. 4.

Method 700 includes generating a scaled band template 710 wherein a plurality of bands in the scaled band template correspond to an equally enumerated plurality of bands in the band template. In one embodiment, the generation is performed for every combination of bands, yielding a plurality of scaled band templates.

Thereafter, the scaled band template that most closely matches the maxima template is determined, identified or selected 720. Action 720 is described in detail in conjunction with FIG. 8.

Subsequently, the shift value and scale value of the scaled band template that most closely matches the maxima template is determined, identified, or selected 730.

More specifically, method 700 of determining the scale value and the shift value, the known template band positions are compared with detected local maximum positions found in template decoding action 440 in FIG. 4 and described in conjunction with FIG. 6. The template search varies the beginning and end positions of local maximum position search range and template position search range. As the beginning and end of the search ranges are varied, positions outside of the search ranges of each array are assumed to have no corresponding position in the other array. For example, positions outside of the template search range have no corresponding local maximum. The beginning of the local maximum search range is assumed to correspond to the beginning of the true template search range. The same assumption is made for the end positions of the two search ranges. Beginning and end search range positions are used to compute a scale factor described in Equation 11:

Scale=(end local maximum range−beginning local maximum range)/(end template range−beginning template range)     Equation 11

The position at the beginning of the template search range is set equal to the beginning of the local maximum range and the end position of the template range is set equal to the end of the local maximum range. Intermediate scaled template positions are computed using the scale factor given above in Equation 11. The match between the scaled band template and the local maximums, as in action 720, is found by determining the number of template positions that have a corresponding local maximum position. A local maximum position is considered to correspond to a template position if the distance between the two is less than a tolerance threshold.

Figure 8:
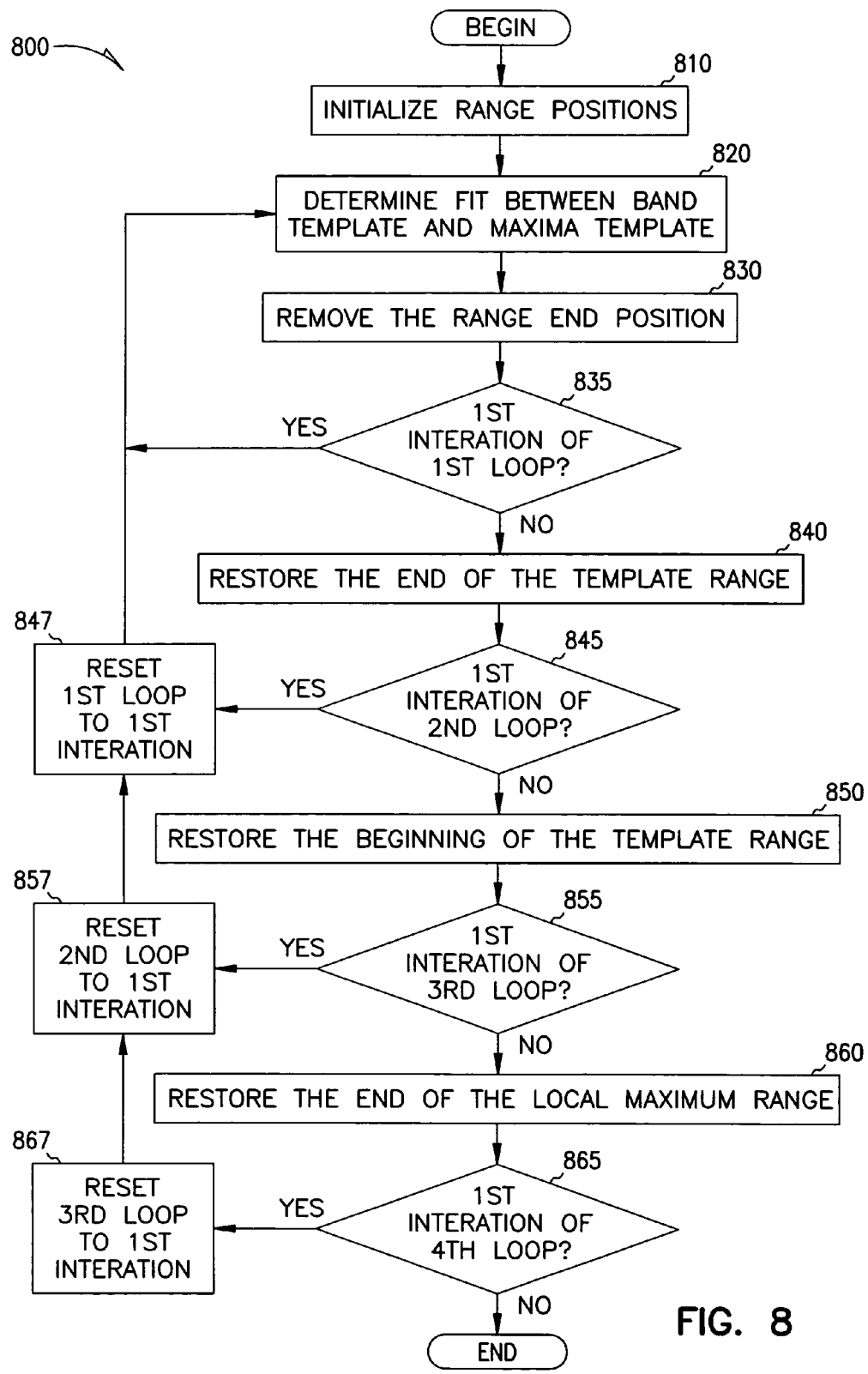
FIG. 8 is a flowchart of a computerized method for selecting the portion of the maxima template and the band template to be compared, as in action 720 in FIG. 700.

FIG. 8 is a flowchart of a computerized method for determining the scaled band template that most closely match the maxima template, as in action 720 in FIG. 700.

The method includes initializing range positions 810, in which the beginning of the local maximum search range is the beginning of the local maximum search array, the end of the local maximum search range is the end of the local maximum array, the beginning of the template search range is the beginning of the template array, and the end of the template search range is the end of the template array.

Figure 8A:
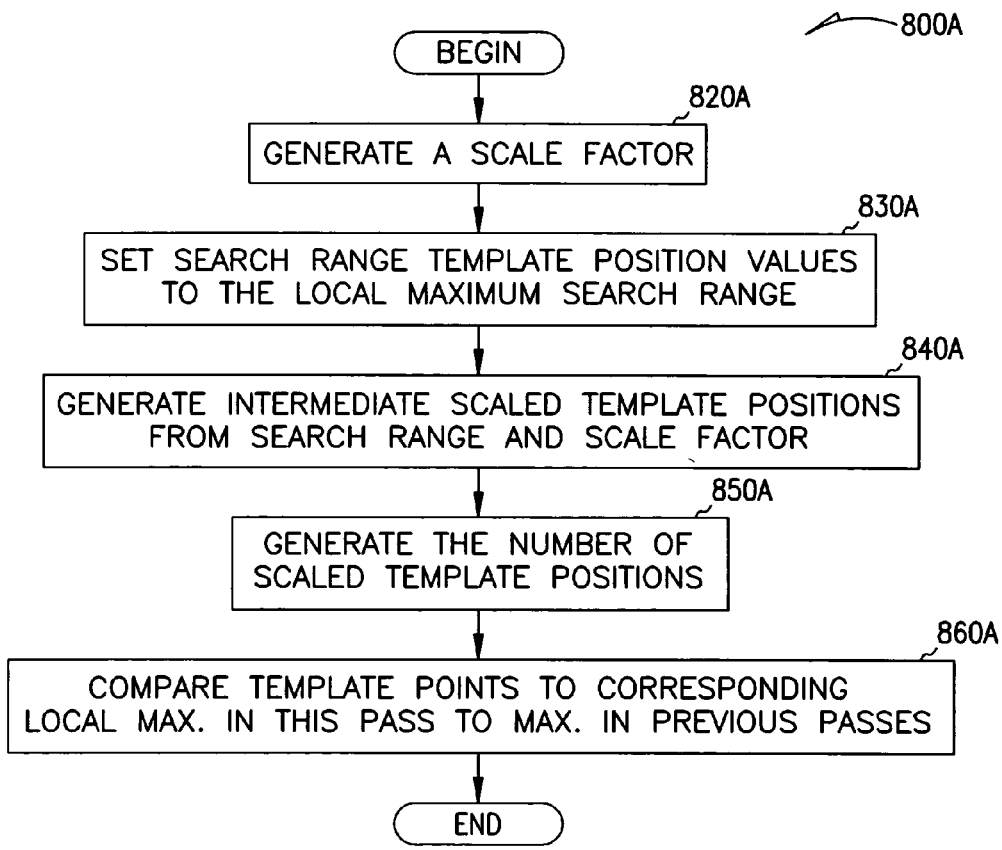
FIG. 8A is a flowchart of a computerized method for determining the scaled band template that most closely matches the band template, as in action 820 in FIG. 800.

Thereafter, the method determines the fit between the scaled band template and the maxima template 820, that is described in detail in FIG. 8A.

If the number of points in the template search range is greater than a minimum permitted number for the range, then in action 830, the range end position is removed from the scaled band template and the new range end is set equal to the next lower position. If a representation of a first loop indicates that this is the first iteration of the first loop 835, then control return to action 820, where the fit between the scaled band template and the maxima template is determined.

Otherwise, the method continues by restoring the end of the maxima template range 840, so that the end of the template range corresponds to the end of the template array. If a representation of a second loop indicates that this is the first iteration of the second loop 845, then the first loop is reset so that the first inner loop is repeated 847, and control returns to action 820, where the fit between the scaled band template and the maxima template is determined.

Thereafter, the method includes restoring the beginning of the scaled band template range, 850, so that the beginning of the scaled band template range is equal the beginning of the template array. If a representation of a third loop indicates that this is the first iteration of the third loop 855, then the second loop is reset 857 and the first loop is reset 847 so that the first inner loop and the second inner loop are repeated, and control returns to action 820, where the fit between the scaled band template and the maxima template is determined.

Lastly, the method includes restoring the end of the local maximum range of the maxima template 860, so that the end of the local maximum range corresponds to the end of the local maximum array. If a representation of a fourth loop indicates that this is the first iteration of the fourth loop 865, then the third loop is reset, 867, the second loop is reset 857, and the first loop is reset 847 so that the first inner loop, the second inner loop are repeated, and the third inner loop are repeated, and control returns to action 820, where the fit between the scaled band template and the maxima template is determined.

For example, where method 800 determines a maxima template having values A, B, C, D, E, and F to a scaled band template having values 1, 2, 3, 4, 5, and 6, A is compared to 1, as described by the notation A-1 and then F is compared to 6, as described by the notation F-6. Where it is required that there are least four templates or maxima values that can be compared, remaining comparisons are shown in Table 3:

TABLE 3

| |
|---|
| A-1 F-6 |
| A-1 F-5 |
| A-1 F-4 |

After which, there are only four template values, the comparison shown in Table 4 are performed:

TABLE 4

| |
|---|
| A-1 E-6 |
| A-1 E-5 |
| A-1 E-4 |
| A-1 D-6 |
| A-1 D-5 |
| A-1 D-4 |

After which, there are four in both the maxima template and the scaled band template, therefore the left end is modified and comparisons as shown in Table 5 are performed:

TABLE 5

| |
|---|
| A-2 F-6 |
| A-2 F-5 |

Thereafter, the four comparisons for the scaled band template in 2 to 5, and comparisons as shown in Table 6 are performed:

TABLE 6

| |
|---|
| A-2 A-6 |
| A-2 E-5 |

Thereafter, four scaled band template values remain, and comparisons as shown in Table 7 are performed:

TABLE 8

| |
|---|
| A-2 D-6 |
| A-2 D-5 |

Thereafter, four values in both maxima template and scaled band template 2 to 5, and comparisons as shown in Table 9 are performed:

TABLE 9

B-1 F-6
B-1 F-5
B-1 F-4
B-1 E-6
B-1 E-5

Subsequently, four values, B to E, remain in the scaled band template, and comparisons as shown in Table 10 are performed:

TABLE 10

B-2 F-6
B-2 F-5

Thereafter, the scale factor is the factor determined for the maximum number of corresponding template and local maximum positions.

FIG. 8A is a flowchart of a computerized method 800A for determining the scaled band template that most closely matches the maxima template, as in action 820 in FIG. 800.

The method includes computing, determining or generating a scale factor 820A using equation 11.

Thereafter, the method includes setting 830A the beginning and end position values of the template search range equal to the beginning and end of the local maximum search range, respectively. The intermediate scaled template positions are computed 840A using the search range beginning and end points and the scale factor. The method also includes computing the number of scaled template positions within the template range having a corresponding local maximum position 850A.

Then the number of template points with corresponding local maximums in this pass is compared to the maximum found in previous passes 860A. If the number of matches for this pass is greater than the previous maximum change the maximum value so that it is equal to the value for this pass. Optionally, the search range beginning and end positions are changed for the best match case. These include the beginning local maximum (A') and scaled template (A") positions, which are equal, and the corresponding original template position (A) and the end local maximum (B').

Figure 9:
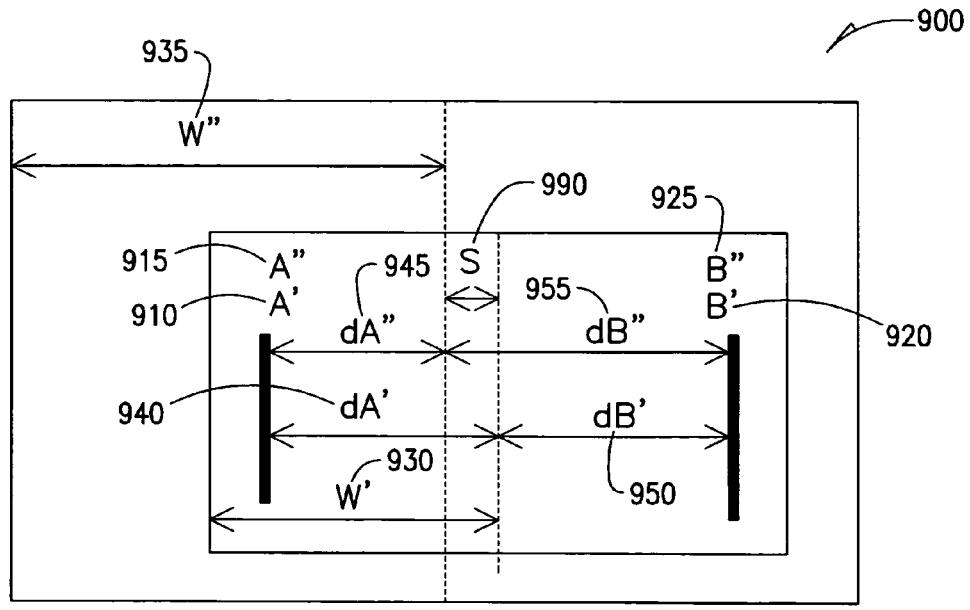
FIG. 9 is a block diagram of an image encoded with a watermark and bands, that is decoded in accordance with method 800.

FIG. 9 is a block diagram of an image encoded with a watermark and bands, that is decoded in accordance with method 800. FIG. 9 represents a case in which the outer rectangle is the original image after scaling. The inner rectangle is the modified image for which a search is being conducted to find the template. The inner rectangle has the same scale factor as the outside rectangle, but it has been cropped and shifted. A' and B' are the beginning and end local maximums, respectively, which are matched with A" and B" which are the beginning and end scaled template band positions, respectively.

Method 800 provides enough information to synchronize the watermark decoder with the primary watermark. For example, A' 910 and A" 915 are associated with the known position A (not shown) in the original watermark, and B' 920 and B" 925 are associated with B in the original. The unprimed variables indicate the final result before matching of the unscaled image to which the scaled imaged is scaled. During inverse scaling of the scaled original, within the outer rectangle in FIG. 9 back to the size of the original, sets A''' (not shown) equal to A"/scale and set B''' equal to B"/scale. dA''' (dA''' not shown) equals A−A''' and dB''' (dB''' not shown) equals B−B''' (B''' not shown). The triple primed variables indicate the final result of matching. If dA''' is greater than zero, then the original has been cropped so that the watermark decoder must begin at position dA''' of the original watermark. If dA''' is negative, then a border has been added to the original, an action which can occur in the case of digital-to-analog (d-to-a) conversion, so that the watermark decoder uses the beginning location of the original watermark position dA''' in the image which is being analyzed. The opposite is the case at the end of the image. If dB''' is less than zero then the original has been cropped so that the watermark decoder must take into account that dB''' watermarked pixels of the original have been removed. If dB''' is positive then a border has been added to the original so that the primary watermark decoder stops a distance dB''' from the edge.

The shift is not required to synchronize the watermark decoder with the primary watermark. The shift is determined as follows: Set variable, N, equal to length of the original frame, where length refers to number of columns or rows. Set variable, N', equal to the length of the modified image which has been shifted and scaled. Set variable, A, and variable, B, equal the beginning and end range positions of the original image, as in the unscaled template described in method 800. Set variable, A' 910, and variable, B', equal to the beginning and end range positions of the modified image. The image is the image from which the local maximums are determined as described in method 800. Set a variable, W, representing center of the original image equal to $(N-1)/2$ and a variable, W' 930, representing the center of the modified image equal to $(N'-1)/2$. Set a variable, dA, representing the distance from the range beginning the original image equal to W−A. Set a variable representing the distance from the range end for the original image equal to B−W. Set a variable, dA' 940, representing the distance for the modified image equal to W'−A' 910. Set a variable, dB' 950, representing the distance for the modified image equal to B'−W'. Set a variable, scale, representing a scale factor equal to $(B'-A'\ 910)/(B-A)$. Set a variable, dA" 945, representing the scaled distances of the original equal to dA*scale. Set a variable, dB" 955, representing the scaled distances of the original equal to dB*scale. Set a variable, W' 930, representing scaled center equal to W" scale 935. Set a variable, $S_A$, representing the shift determined from the beginning positions equal to dA'−dA". Set a variable, $S_B$, representing the shift determined from the end positions equal to dB'−dB". Set a variable, S990, representing the average shift equal to $(S_A+S_B)/2$.

Implementation

Figure 10:
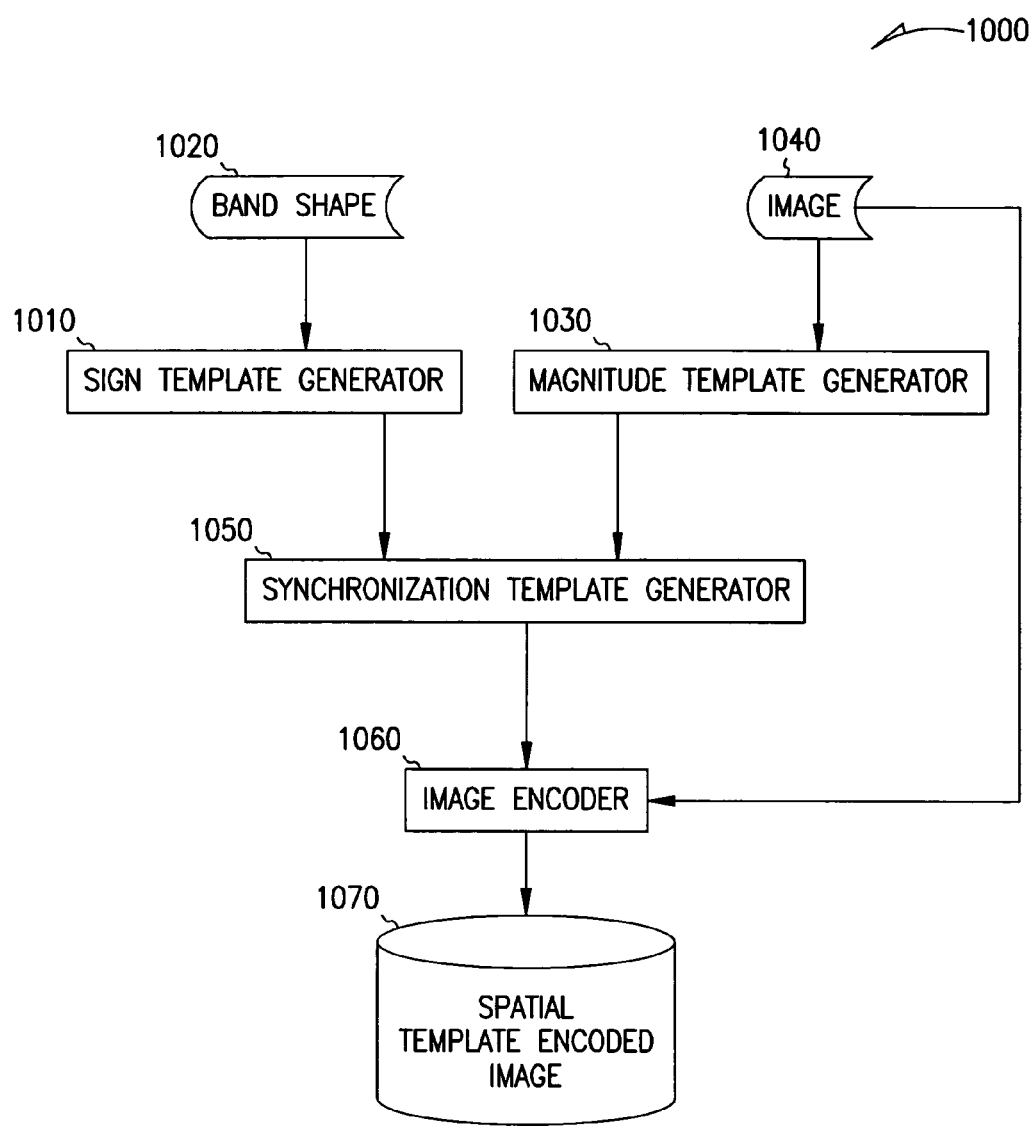
FIG. 10 is block diagram of an encoder of a spatial template into an image.
Figure 11:
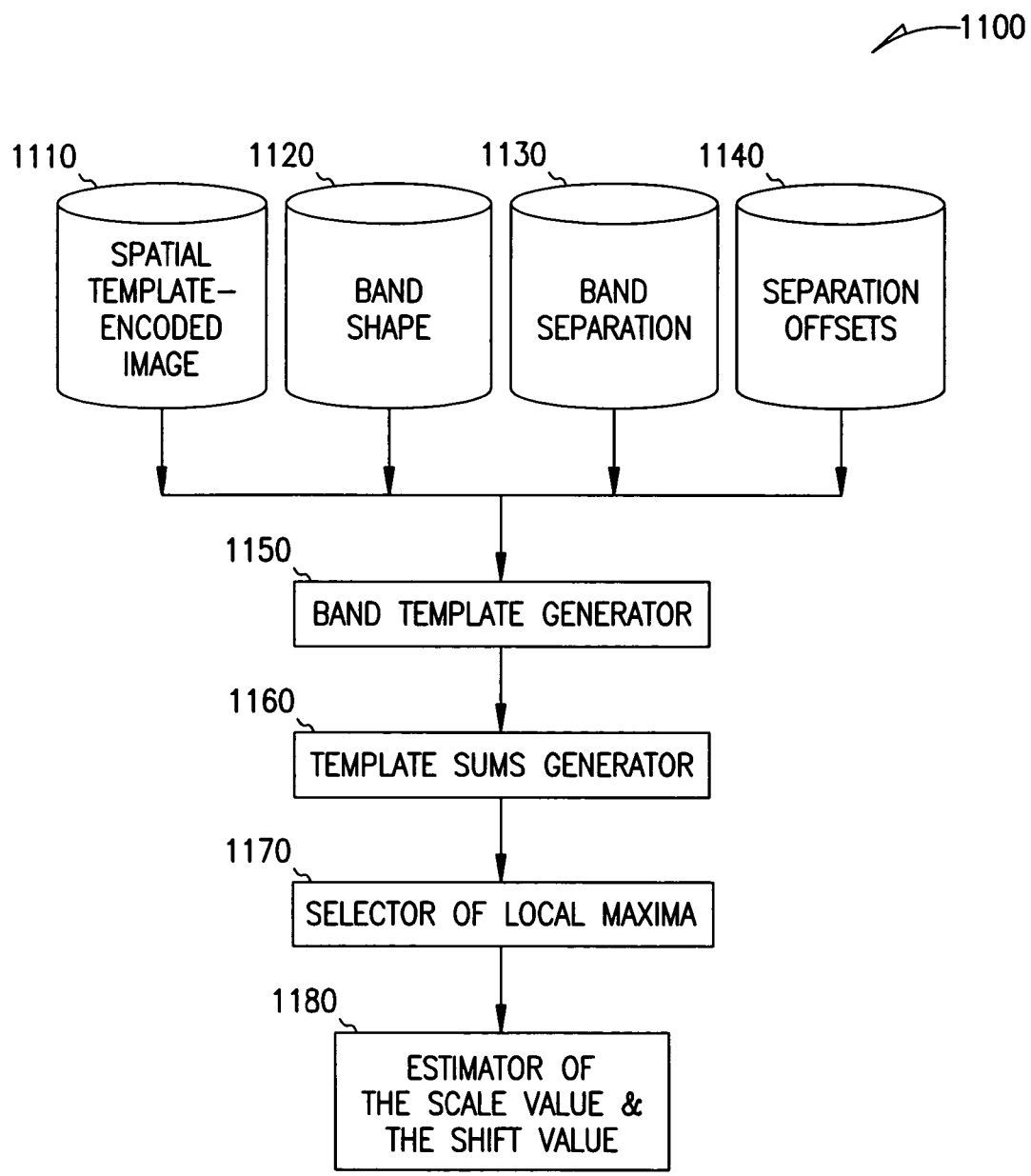
FIG. 11 is a block diagram of a decoder of a spatial template from an image generated by the system in FIG. 10.

Referring to FIGS. 10–11, a particular implementation 1000 and 1100 of the invention is described in conjunction with the system overview in FIG. 2 and the methods described in conjunction with FIGS. 3–9.

FIG. 10 is a block diagram of an encoder 1000 of a spatial template into an image that performs method 300 described in conjunction with FIG. 3. System 1000 includes a sign template generator 1010 that receives one or more band shape(s), and performs action 310 in method 300 described in conjunction with FIG. 3. The system also includes a magnitude template generator 1030 that receives an image, that is to be encoded, and performs action 320 in method 300 described in conjunction with FIG. 3. The magnitude template generator 1030 and the sign template generator 1010 are operatively coupled to a synchronization template generator 1050. The magnitude template generator 1030 performs action 330 in method 300 described in conjunction with FIG. 3 In one embodiment, the synchronization template generated by the synchronization template generator 1050 is transmitted to an image encoder 1060, in which the synchronization template generator 1050 also receives the image 1040, and combines the synchronization template and the image are combined to produce a spatial template-encoded image 1070 and as in image 200 in FIG. 2. The image encoder 1060 performs action 340 in method 300 described in conjunction with FIG. 3.

FIG. 11 is a block diagram of a decoder 1100 of a spatial template from an image generated by system 1000 in FIG. 10. The system includes a band template generator 1050 that receives information that includes an image encoded with a spatial template 1010 and as in image 200 in FIG. 2, the band shape 1020 of the spatial template, the band separation 1030 of the spatial template, and the band separation offset information 1040 of the spatial template. The band template generator 1050 generates a band template (not shown) in accordance with action 410 in method 400 in FIG. 4 from the received information. The band template generator 1050 is operatively coupled to a row and column sums generator 1060. The band template generator 1050 transmits the band template to the row and column sums generator 1060. The row and column sums generator 1060 determines row and column sums of the band template in accordance with action 420 in method 400 in FIG. 4. The row and column sums generator 1060 is operatively coupled to a selector of local maxima 1070. The row and column sums generator 1060 transmits the template sums to the selector of local maxima 1070. The selector of local maxima 1070 selects the local maxima and minima from the template sums in accordance with action 440 in method 400 in FIG. 4 and method 600 in FIG. 6. Optionally, the selector of local maxima 1070 enhances the local maxima and minima from the template sums in accordance with action 430 in method 400 in FIG. 4 before the local maxima and minima are selected. The selector of local maxima 1070 is operatively coupled to an estimator of the scale value and the shift values 1080. The selector of local maxima 1070 transmits the selected local minima and maxima to the generator of the scale value and the shift values 1080. The generator of the scale value and the shift values 1080 determines the scale and shift values of the image in accordance with action 450 in method 400 in FIG. 4 and method 700 in FIG. 7.

The system 1000 and 1100 components can be embodied as computer hardware circuitry or as a computer-readable program, or a combination of both.

More specifically, in the computer-readable program embodiment, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI). The components execute on as few as one computer as in computer 110 in FIG. 1, or on at least as many computers as there are components.

Conclusion

A system and method for encoding an image with a spatial template has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, although described in object-oriented terms, one of ordinary skill in the art will appreciate that the invention can be implemented in a procedural design environment or any other design environment that provides the required relationships.

In particular, one of skill in the art will readily appreciate that the names of the methods and apparatus are not intended to limit embodiments of the invention.

Systems and methods are disclosed through which a template in the spatial domain is generated and combined with an image. Later, the combined image can be decoded to determine the extent of scaling and or shifting or the combined image. The template comprises at least one vertical or horizontal band. The horizontal band(s) determine the extent of scaling and/or shifting along the vertical axis, and the vertical bands determine the extent of scaling and/or shifting along the horizontal axis of the combined image. Using both horizontal and vertical bands enables decoding of shifting and scaling along both axis, and creates a grid. Each band specifies a predetermined characteristic of modifying the luminance of the corresponding pixels of the image. In one alternative, the modification of the image is performed to the extent that the bands are invisible to the naked eye.

The terminology used in this application with respect to is meant to include all object-oriented, database and communication environments and alternate technologies which provide the same functionality as described herein. Therefore, it is manifestly intended that this invention be limited only by the following claims and equivalents thereof.

We claim:

1. A computer-readable medium having stored thereon a program of instructions executable by a processor to perform a method comprising:
    embedding at least one band into an image by
        generating a sign template from a predetermined band shape;
        generating a magnitude template from the image;
        generating a synchronization template from the sign template and the magnitude template; and
        generating a template encoded image from the image and the synchronization template.

2. The computer-readable medium as in claim 1, wherein generating the sign template from the predetermined band shape comprises:
    generating a plurality of sign bands from information comprising a predetermined starting position and a plurality of predetermined separation distances; and
    wherein the sign template has substantially same dimensions as the image.

3. The computer-readable medium as in claim 2, wherein generating the sign template further comprises randomly offsetting the predetermined separation distances.

4. The computer-readable medium as in claim 1, wherein generating the magnitude template from the image comprises:

generating a plurality of pixel magnitudes from a luminosity of a corresponding pixel in the image, a filter, and a predetermined coefficient; and wherein the magnitude template has substantially same dimensions as the image.

5. The computer-readable medium as in claim 1, wherein generating the synchronization template from the sign template and the magnitude template comprises:

generating a product of the sign template and the magnitude template; and wherein the synchronization template has substantially same dimensions as the image.

6. The computer-readable medium as in claim 1, wherein generating the template encoded image comprises:

generating a sum of the image and the synchronization template; and wherein the template encoded image has substantially same dimensions as the image.

7. A computer-readable medium having stored thereon a program of instructions executable by a processor to perform a method of producing a watermarked image, the method comprising:

generating a sign template from a predetermined band shape;

generating a magnitude template from the image;

generating a synchronization template from the sign template and the magnitude template; and generating a template encoded image from the image and the synchronization template.

8. The computer-readable medium as in claim 7, wherein generating the sign template from the predetermined band shape comprises:

generating a plurality of sign bands from information comprising a predetermined starting position and a plurality of predetermined separation distances; and wherein the sign template has substantially same dimensions as the image.

9. The computer-readable medium as in claim 7, wherein generating the magnitude template from the image comprises:

generating a plurality of pixel magnitudes from a luminosity of a corresponding pixel in the image, a filter, and a predetermined coefficient; and wherein the magnitude template has substantially same dimensions as the image.

10. A computer-readable medium having stored thereon a program of instructions executable by a processor to perform a method for determining a shift value and a scaling value of an image having an embedded grid, the method comprising:

synchronizing the grid with the image by determining positions of bands in the grid from the image, the band shape, band separation, and separation offsets, yielding a band template;

determining row and column sums from the image, the sums having local maxima and local minima;

enhancing the local maxima and local minima of the row and column sums;

determining a local maxima template from enhanced row and column sums; and determining the scale value and the shift value from the local maxima template and the band template.

11. The computer-readable medium as in claim 10, wherein enhancing the local maxima and local minima of the row and column sums comprises:

enhancing the local maxima and local minima of the row and column sums to an intermediate degree; and enhancing the local maxima and local minima of the row and column sums to a final degree.

12. The computer-readable medium as in claim 11, wherein enhancing the local maxima and local minima of the row and column sums to the intermediate degree further comprises:

determining the positive row sum;

determining the negative row sum;

determining the positive column sum;

determining the negative column sum; and wherein enhancing the local maxima and local minima of the row and column sums to the final degree further comprises subtracting from the intermediate enhanced value, the average of the two intermediate enhanced row sums in the neighborhood;

determining a local maxima template from enhanced row and column sums; and determining the scale value and the shift value from the local maxima template and the band template.

13. A computer-readable medium having stored thereon a program of instructions executable by a processor to perform a method for determining a shift value and a scaling value of an image having an embedded grid, the method comprising:

synchronizing the grid with the image by determining positions of bands in the grid from the image, the band shape, band separation and separation offsets, yielding a band template, by generating a plurality of sign bands from information comprising a predetermined starting position and a plurality of predetermined separation distances, and wherein the band template has substantially same dimensions as the image;

determining row and column sums from the image, the sums having local maxima and local minima;

enhancing the local maxima and local minima of the row and column sums;

determining a local maxima template from enhanced row and column sums; and determining the scale value and the shift value from the local maxima template and the band template.

14. The computer-readable medium as in claim 13, wherein determining the positions of the bands to yield the band template further comprises randomly offsetting the predetermined separation distances.

15. The computer-readable medium as in claim 13, wherein enhancing the local maxima and local minima of the row and column sums comprises:

enhancing the local maxima and local minima of the row and column sums to an intermediate degree; and enhancing the local maxima and local minima of the row and column sums to a final degree.

* * * * *